Dec. 9, 1958   W. HERBERT ET AL   2,863,527
PROCESS FOR THE PURIFICATION OF GASES
Filed July 27, 1955   5 Sheets-Sheet 1

$H_2S$ ABSORPTION IN METHANOL

INVENTORS:
WILHELM HERBERT, HANS-ULRICH KOHRT, RUDOLF BECKER, AND
HEDWIG GERTRUD DANULAT, ILSE DANULAT, HANS-FRIEDRICH DANULAT,
AND DIETER DANULAT - ADMINISTRATORS OF FRIEDRICH DANULAT, DECEASED
BY: Burgess, Dinklage & Sprung  ATTORNEYS

CO₂ ABSORPTION IN WATER

INVENTORS:
WILHELM HERBERT, HANS-ULRICH KOHRT, RUDOLF BECKER, AND
HEDWIG GERTRUD DANULAT, ILSE DANULAT, HANS-FRIEDRICH DANULAT,
AND DIETER DANULAT - ADMINISTRATORS OF FRIEDRICH DANULAT, DECEASED
BY: Burgess, Dinklage & Sprung ATTORNEYS Dec. 9, 1958  W. HERBERT ET AL  2,863,527
PROCESS FOR THE PURIFICATION OF GASES
Filed July 27, 1955  5 Sheets-Sheet 4

INVENTORS:
WILHELM HERBERT, HANS-ULRICH KOHRT, RUDOLF BECKER, AND
HEDWIG GERTRUD DANULAT, ILSE DANULAT, HANS-FRIEDRICH DANULAT,
AND DIETER DANULAT - ADMINISTRATORS OF FRIEDRICH DANULAT, DECEASED
BY: Burgess, Dinklage & Sprung — ATTORNEYS

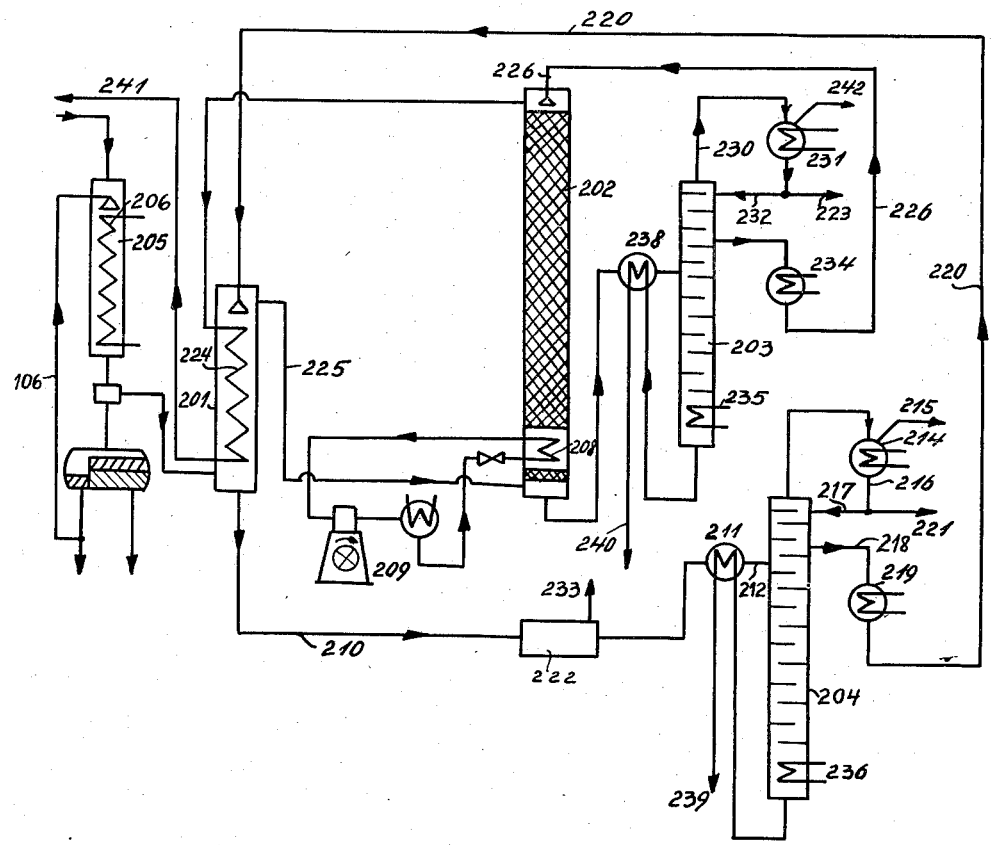

United States Patent Office 2,863,527
Patented Dec. 9, 1958

2,863,527
PROCESS FOR THE PURIFICATION OF GASES

Wilhelm Herbert, Frankfurt am Main, Hans-Ulrich Kohrt, Bad Homburg von der Hohe, Rudolf Becker, Munich-Solln, and Friedrich Danulat, deceased, late of Frankfurt am Main, Germany, by Hedwig Gertrud Danulat, Ilse Danulat, Hans Friedrich Danulat and Dieter Danulat, administrators, Frankfurt am Main, Germany, assignors to Metallgesellschaft, Aktiengesellschaft, Frankfurt am Main, Germany, a corporation of Germany Application July 27, 1955, Serial No. 524,694

Claims priority, application Germany September 15, 1949

19 Claims. (Cl. 183—115)

This invention relates to a process for the purification of gases and is a continuation-in-part and consolidation of United States patent application Serial Nos. 181,608, filed August 26, 1950; 210,442, filed February 10, 1951, and 260,576, filed December 7, 1951, all of which are now abandoned.

The invention more particularly relates to the purification of combustible gases which contain at least one of carbon monoxide, hydrogen and methane. Such gases are generally used for industrial and/or heating purposes and include, for example, synthesis gases for the Fischer-Tropsch synthesis and related processes, hydrogen-rich gas mixtures which may additionally contain nitrogen for the production of pure hydrogen, catalytic hydrogenation or for ammonia synthesis, municipal heating gases, natural gases, gases obtained from the distillation or gasification of solid carbonaceous fuels, producer gas, tail gases from chemical processes, gases from the cracking of fuels, etc.

These gases generally contain hydrogen sulfide and other impurities, such as organic sulfur compounds, gum and resin formers, and cyanogen compounds.

The term "organic sulfur compounds," as used herein and in the art is intended to designate a group of impurities such as carbon sulfide, carbon oxy-sulfide, and compounds of the type RSH, $R_2S$, and $R_2S_2$, in which R represents an aliphatic aromatic or hydroaromatic radical. These compounds and hydrogen sulfide are objectionable in fuel gases, and are highly active catalyst poisons, which must be removed from gases which are intended for use in conjunction with catalysts, as, for example, Fischer-Tropsch synthesis gas.

The term "gum and resin formers" as used herein and in the art is intended to designate a group of compounds containing unsaturated bonds, such as vinyl, acetylene, vinyl acetylene, indene, cyclopentadiene, fulvene, dimethyl fulvene, styrene, coumarin, and derivatives of these compounds. These compounds, owing to their highly unsaturated character, have a tendency to polymerize, forming gum and resinous deposits, which are, of course, undesirable.

The term "cyanogen compounds" as used herein and in the art is intended to designate compounds such as HCN, $(CN)_2$, $(CN)_x$, RCN, in which R is a hydrocarbon radical, as for example, methyl cyanide, $(CNS)_2$, etc. The cyanogen compounds are undesirable in fuel gases, are toxic, and constitute catalyst poisons.

In the past, the purification of these gases had to be effected by a combination of purification processes, each directed to a specific impurity or a specific group of impurities. This was cumbersome and highly uneconomical.

One object of this invention is a single process which will allow the complete purification of the combustible gases specified above. This, and still further objects will become apparent from the following description, read in conjunction with the drawings, in which.

Figure 4:
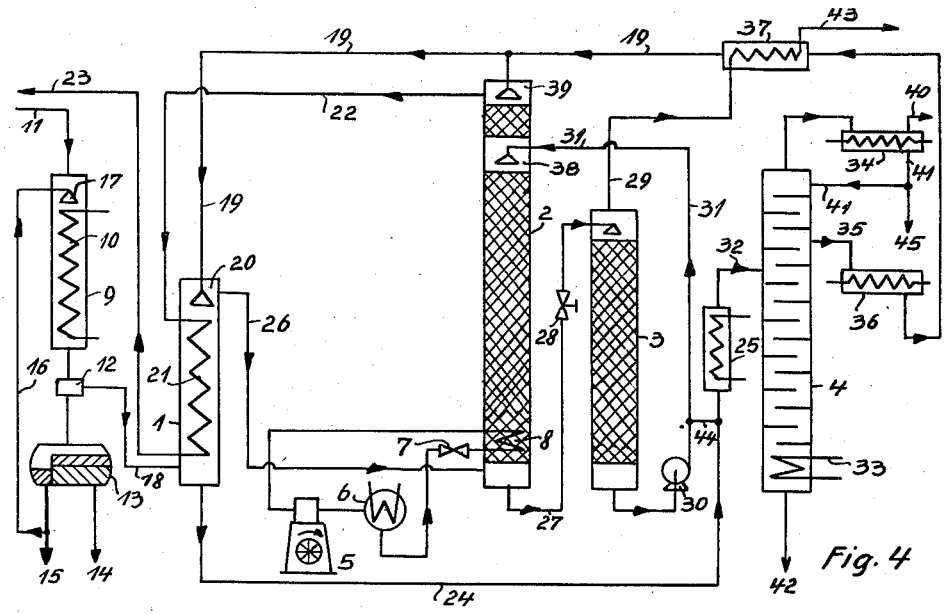
Figure 5:
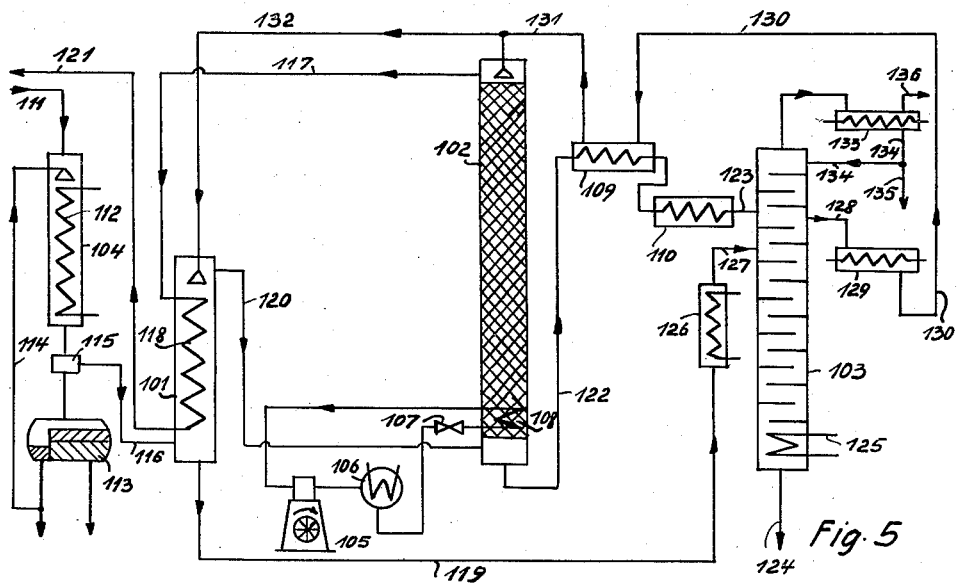

Fig. 4 diagrammatically illustrates an embodiment of a plant for effecting the process in accordance with the invention which is particularly well suited for use in conjunction with the purification of gases having a relatively high quantity of impurities such as carbon dioxide;

Fig. 5 diagrammatically illustrates a further embodiment of a plant for effecting the process in accordance with the invention which is particularly well suited for use in connection with the purification of gases having a relatively small concentration of impurities to be removed, and Fig. 6 diagrammatically illustrates a further embodiment of a plant for effecting the process in accordance with the invention which is particularly well suited for use in connection with the purification of gases which are rich in gaseous hydrocarbons, but which have a relatively low content of carbon monoxide and hydrogen as, for example, natural gases, gases obtained from the cracking of petroleum products, and tail gases from catalytic carbon monoxide hydrogenation.

In accordance with the invention, the purification is effected by washing the gas at a temperature below zero, such as below $-10°$ C. and preferably below $-30°$ C. at a pressure of at least 2 atmospheres with a polar organic washing agent having a freezing point below the washing temperature and being substantially chemically inert to the impurities to be removed. The lower limit of the temperature applicable is only determined by technical considerations and, for example, temperatures as low as $-100°$ C. may be used. The preferable temperature range is about between $-45°$ C. and $-75°$ C.

The washing should be effected at pressures of at least 2 atmospheres, such as pressures between about 2 and 50 atmospheres. It has been found preferable to use pressures between about 8 and 20 atmospheres, though pressures as high as 120 atmospheres may be used if the gas to be purified will not liquefy under such high pressures. These high pressures may, for example, be used with carbon monoxide mixtures.

The washing may be effected in one or more stages and, since the same involves the physical dissolving of the impurity in the washing agent as opposed to a chemical reaction or purification, any organic polar washing agent which will not react chemically and which is liquid at the washing temperatures, may be used.

The polar organic washing agents are characterized by the fact that, due to their polar nature, they can absorb water. Some of the polar organic washing agents are miscible in every proportion with water and others will form eutectic mixtures with water which will solidify only at extremely low temperatures. The degree of miscibility with the water increases with the polarity of the compound. It has been found preferable to use eutectic mixtures with a low solidification point which contain about 1–50% water.

The washing agents which may be used in accordance with the invention includes mixtures or solutions which are liquid at the washing temperature but which may contain individual components which alone would not be liquid at these low temperatures.

In addition to methanol, which is the preferable polar organic liquid washing agent, examples of washing agents which may be used include: aliphatic monovalent alcohols, such as ethyl alcohol and propyl alcohol, or cyclic alcohols, such as cyclopentanol and cyclohexanol; aliphatic polyvalent alcohols, such as ethylene glycol, propylene glycol and glycerin; lower ketones such as acetone, diethylketone, methylbutylketone; simple cyclic ketones such as cyclopentanone and cyclohexanone; lower ethers such as diethylether, methylethylether, methylpropylether or cyclic ethers such as dioxane; lower esters such as methylesters, ethylesters, propylesters and butylesters of formic acid, acetic acid, propionic acid and butyric acids; aliphatic nitriles, such as acetonitrile propionitrile; aromatic hydroxy compounds such as carbolic acid, cresols, xylenoles, pyrocatechol, resorcinol, homopyrocatechol, isohomopyrocatechol; and aromatic nitrogen compounds such as aniline, toluidine, and quinoline.

Certain of the abovementioned compounds as, for example, aromatic dihydroxy compounds such as pyrocatechol, resorcinol, etc., have melting points of more than 100° C. and are therefore no longer liquid at the washing temperatures. These substances, may however, be used in the form of mixtures of solutions which are liquid at the low washing temperatures.

The washing with the organic polar washing agent will remove the hydrogen sulfide, organic sulfur compounds, gum and resin formers, cyanogen compounds, and carbon dioxide, which may be present as impurities in the gas. In addition, it is also possible to remove certain undesirable non-polar constituents from the gas, as, for example, lower hydrocarbons. The polar organic washing agents in addition to the polar group also generally contain a non-polar group as, for example, the methyl radical in the methanol. Due to the presence of this non-polar group, the non-polar constituent to be removed is soluble to a certain extent. The relative degree of solubility of polar materials in the washing agent may be increased by increasing the polarity of the washing agent, as, for example, by the addition of water. Conversely, the relative degree of solubility of non-polar substance in the washing agent may be increased by the addition of a non-polar substance to the washing agent. The gas to be purified may be washed in several stages with washing agents of different polarity, for example, in one or more stages with a polar washing agent and in at least one separate stage with a non-polar washing agent. The removal of the non-polar constituents, such as the lower boiling hydrocarbons, thus may be aided by admixing a non-polar organic washing agent with the polar washing agent or by effecting washing in a separate stage with the non-polar washing agent. Non-polar washing agents which may be used include, for example, low-boiling aliphatic or cyclic straight-chained or branch-chained hydrocarbons, which may also contain unsaturated bonds as, for example, benzene or gasoline fractions, such as N-pentane, isopentane, N-hexane, isohexane, N-heptane, dimethylpentane, trimethylpentane, triethylmethane, naphthene, cyclopentane, methylcyclopentane, cyclohexane, methylcyclohexane, and the like.

The non-polar washing agents may also be used in the form of eutectic mixtures of low freezing points with isomers or other hydrocarbons, such as aliphatic saturated, unsaturated, and/or straight, and/or branch-chained cyclic hydrocarbons, aromatics, branched aromatics, or their mixtures.

All the washing agents in accordance with the invention may either be used singly or in any desired admixture.

It has further been found preferable to separate the higher boiling substances from the gas as, for example, gases obtained from the gasification or dry distillation of solid carbonaceous fuel prior to the low temperature washing. This preliminary separation may be effected by condensation in the presence of a polar organic washing liquid, by cooling to a temperature below 0° C. The polar organic washing liquid used in this connection is preferably the same washing agent used in the washing process proper. This preliminary separation may thus, strictly speaking, be considered as a part of the washing process in accordance with the invention.

The low-temperature washing will also effect the removal of ammonia, which may be present in the gas, though it is preferable to previously separate this ammonia in the conventional manner by washing with water or dilute sulfuric acid prior to the low-temperature washing.

In the same manner, hydrocyanic acid may be recovered prior to the low-temperature scrubbing.

It is preferable to choose a washing temperature at which losses of the washing agent by evaporation into the purified gas are kept at a minimum, so that a special recovery of the washing agent from the gases is not necessary. If, for example, carbon oxy sulfide and hydrogen sulfide are to be washed out substantially completely from the gas under a pressure of 20 atmospheres, the temperature of the washing agent should be kept, for example, at about the boiling point of the hydrogen sulfide, i. e., at about −60° C.

If carbon dioxide is to be removed to a greater extent in order to increase, for example, the caloric efficiency of the gas, this may be effected by lowering the temperature or increasing the quantity of the washing agent. The carbon dioxide removed may be obtained free from sulfur compounds by washing out the greater proportion of the carbon dioxide in an additional low-temperature washer. Hydrogen sulfide and carbon monoxide can, however, also be washed out in one or in two consecutive stages and a third washing stage may be provided which is preferably operated at a lower temperature for the removal of the residual sulfur-containing materials.

After the low-temperature washing, the washing agent may be regenerated and reused in the process. The regeneration of the washing agent is preferably effected by distillation and rectification with the heat or cold generated during the various stages of the process being utilized appropriately.

If the washing is effected in a multiple number of washing stages with the selective removal of various components in each of these stages, the individual gas components may be separately recovered.

With the washing at extremely low temperatures, certain economical disadvantages are encountered in producing the very low temperature itself and due to the increase of the viscosity. The optimum washing temperature depends on the partial pressure of the components to be removed and on the viscosity of the washing agent used. This temperature, however, generally ranges between about −10 and −50° C., which may be obtained by means of a refrigerating machine.

If, however, the regeneration of the washing agent is effected by pressure release of an absorbed component, as, for example, $CO_2$, and if this component is absorbed by the washing agent in sufficient quantity, the re-evaporation of the component caused by the pressure release will remove further sensible heat from the system and further lower the temperature. The washing agent thus additionally cooled, may, for example, have a temperature of −65° C. This regeneration by pressure release with the accompanying removal of heat further decreases the quantity of washing agent necessary and increases the economy of the process.

After the gas has been purified, the purified compressed gas, such as coke oven gas, for example, may be subjected to separation into its components by a further cooling, as, for example, temperatures of −180 to −190° C. In this connection it is advisable, in order to avoid a freezing out of residual carbon dioxide, to spray in methyl alcohol or the like down to a temperature of −80° C. and methyl alcohol-water mixtures, for example, of 78% by weight methyl alcohol and 22% by weight water, corresponding to the eutectic mixture at temperatures from below −80° C. to temperatures of about −130 to −140° C., or to scrub the gas countercurrent with the same.

Figure 3:
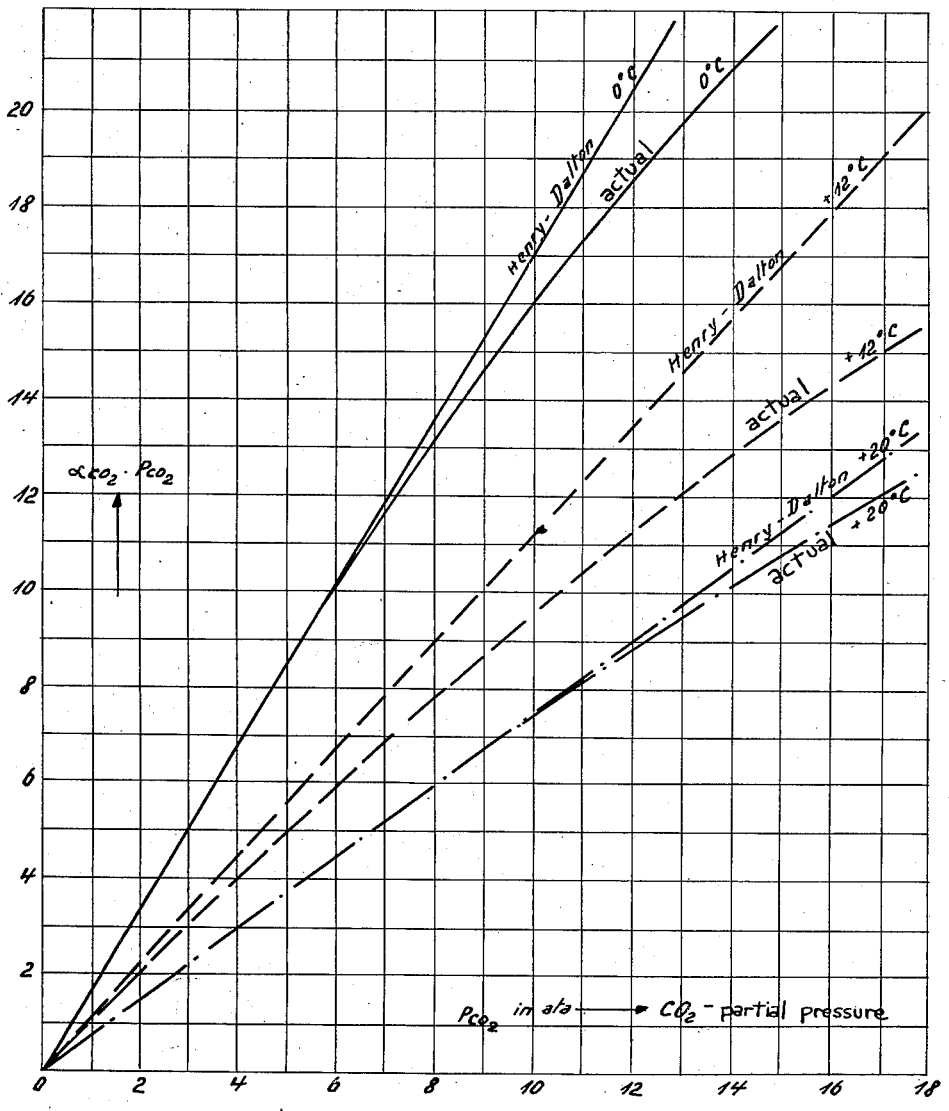
Fig. 3 is a graph showing the absorption of carbon dioxide in water at various pressures and temperatures, as should occur in accordance with Henry's law, and as actually occurs.

It is well known, in accordance with Henry's law that the amount of gas which will be dissolved in a liquid at a given temperature is proportional to the pressure of the gas. It is further known that the solubility of a gas in liquid generally decreases with an increasing temperature. In connection with the dissolving of carbon dioxide in water under pressure, the actual amount of carbon dioxide which will be dissolved in the water is less than that which can be expected in accordance with Henry's law at lower temperature. This is shown in Fig. 3. As may be noted, at +20° C., the amount of carbon dioxide dissolved in the water with increasing pressure closely approximates that which may be expected in accordance with Henry's law. At the lower temperatures of +12 and 0° C., however, a much lesser quantity of carbon dioxide is dissolved in the water than can be expected in accordance with Henry's law.

In view of the known amounts of the gaseous impurities, such as $H_2S$, which could be expected to be dissolved in organic polar washing agents such as methanol in accordance with Henry's law, and further, in view of the unfavorable variances from the law as occurs with the washing of carbon dioxide in water, it would never be suspected that the low-temperature washing in accordance with the invention could be effective or practical.

Very surprisingly and unexpectedly, however, it has been found that, when operating under the washing conditions in accordance with the invention, using the polar organic washing agent, the actual amount of the gas which will be dissolved in the washing liquid is much greater than can be expected in accordance with Henry's law.

Figure 1:
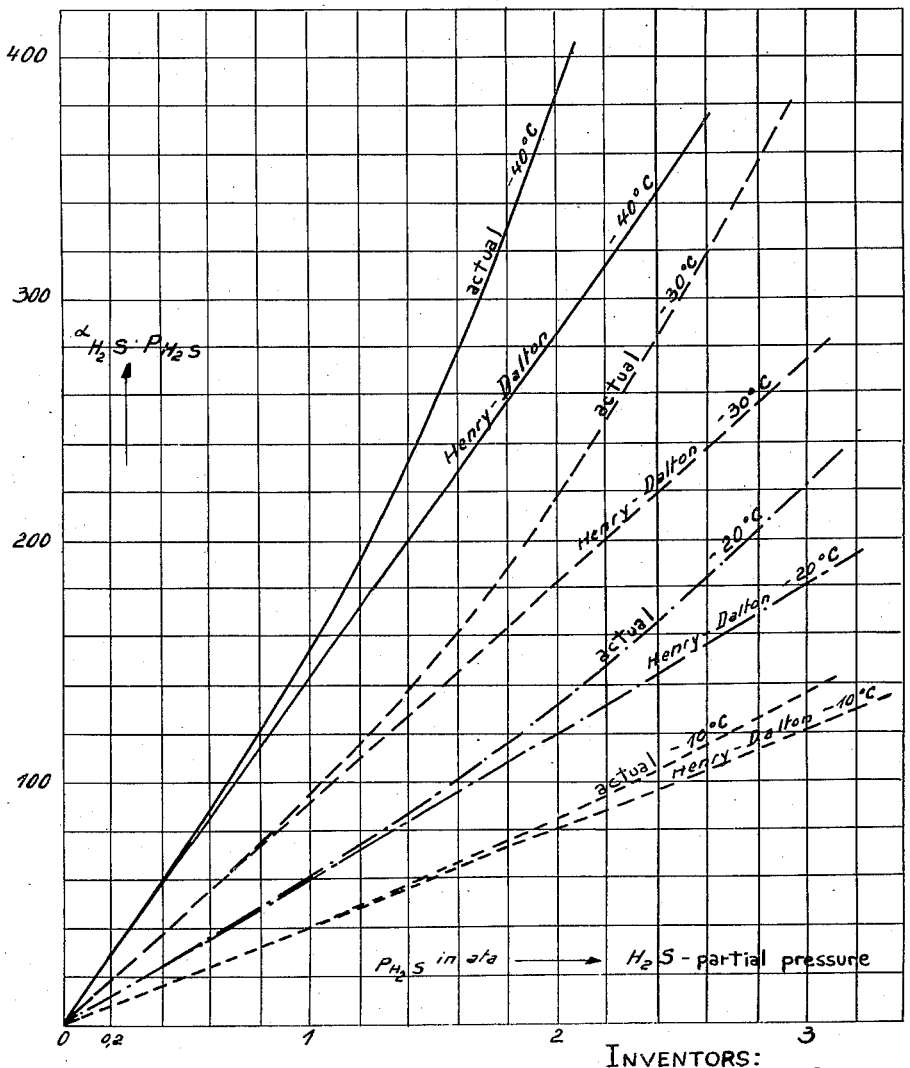
Fig. 1 is a graph showing the absorption of hydrogen sulfide in methanol at various temperatures and pressures, as should occur in accordance with Henry's law, and as actually occurs in accordance with the invention.
Figure 2:
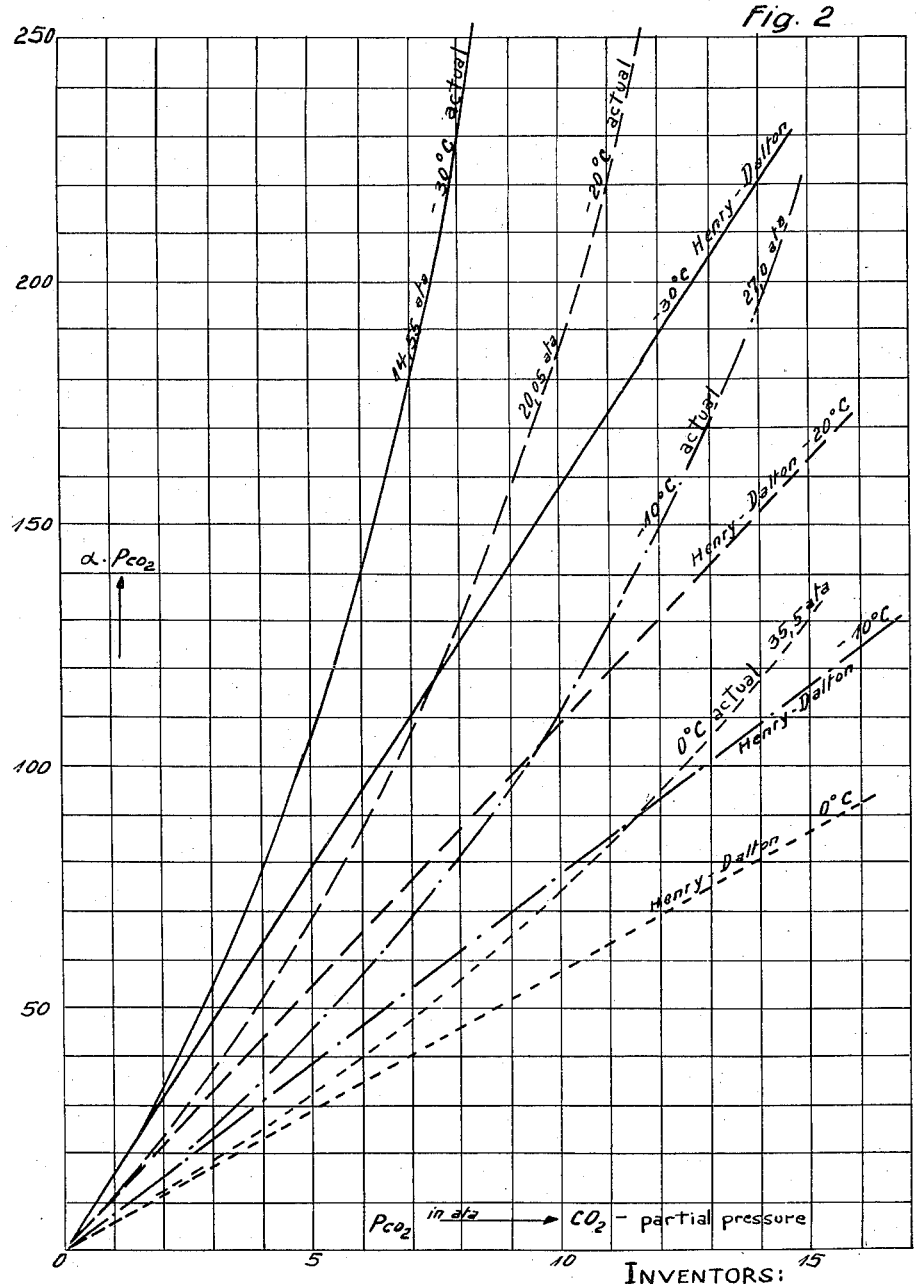
Fig. 2 is a similar graph showing the absorption of carbon dioxide in methanol.

In Figs. 1 and 2, graphs are shown plotting the absorption of hydrogen sulfide and carbon dioxide respectively in methanol at various temperatures and pressures as should occur in accordance with Henry's law and the deviations therefrom which actually occur in accordance with the invention. In the graph of Fig. 3, the absorption of carbon dioxide in water at various pressures and temperatures is depicted as the same should occur in accordance with Henry's law and as the same actually occurs. In all of the graphs the solubility of the gas in the liquid is determined in the conventional manner that is, by determining the Bunsen absorption coefficient, i. e., Bunsen α value which expresses how many liters of the gas will dissolve in the liquid at a pressure of the gas of one atmosphere above that of the liquid. On the graphs, the product of the Bunsen absorption coefficient and partial pressure (values indicated on the ordinate) is plotted against the partial pressure (values indicated on the abscissa) at various temperatures for the specific liquid used as the absorbing agent. There can be seen from Figs. 1 and 2, that the dissolved quantities of gas when using methanol at low temperatures sharply increases with increasing partial pressure of the gas. At lower temperatures and higher partial pressures of the gas there are absorbed substantially greater quantities of the gas then could be expected in accordance with the Henry law. Therefore, at lower temperatures and higher partial pressures smaller quantities of washing agents are required than would have been calculated following the law of Henry. However, in the absorption of $CO_2$ in water (Fig. 3) the solubility decreases with increasing partial pressure as compared with what could be expected according to Henry's law. Thus the pressure water washing is not entirely effective in the lower temperature range.

As seen in Fig. 1 of the drawing, the amount of hydrogen sulfide which will be dissolved in methanol, increases over the amount which can be expected in accordance with Henry's law at −10° C. and below with a much greater than expected absorption occurring at the lower temperatures. In Fig. 2 the same result is shown in connection with the dissolving of carbon dioxide in methanol at increased pressure.

Due to this highly unexpected favorable deviation from Henry's law, the purification in accordance with the invention becomes practical.

The invention will be described in further detail with reference to the embodiments of the plant set-ups as shown in the drawings and with specific examples of operation thereof:

The installation shown in Fig. 4 essentially consists of the pressure-resistant and heat insulated scrubbing or washing towers 1 and 2; the pressure-reduction vessel 3 which is also insulated; a rectifier column 4, a refrigerator with compressor 5, the condenser 6, the pressure reduction valve 7, the evaporator 8, which is arranged in the lower end of the washing tower 2, and the pre-cooler 9.

The crude gas which is to be purified enters the pre-cooler 9 through conduit 11 at a pressure of 10 to 40 atmospheres and with the ambient temperature or a slightly elevated temperature, and flows downward over cooling surfaces 10, for instance cooling coils or the like, which are kept at a temperature of 0 to 5° C. by water or a coolant obtained in the subsequent process. In this cooler there condenses a considerable part of the moisture contained in the gas, as well as other condensable components such as hydrocarbon vapors and the like. Gas and condensate leave the pre-cooler at its lower end and enter a separator 12 in which the gas and liquid are separated. The liquid flows into a separating vessel 13 in which water and the portion of the condensate not soluble therein are separated into layers and removed separately through the discharge lines 14 and 15.

The portion of the condensate which is not soluble in water consists of hydrocarbons which boil in about the gasoline range, and have, for example, a carbon number between about $C_6$ and $C_{12}$. If the starting gases are coke oven gases, this portion consists predominantly of aromatic materials. If the starting gases are gases which are produced by the gasification of solid fuels with oxygen, steam or the like under pressure, this portion predominantly consists of a mixture of aliphatic, unsaturated, and naphthenic hydrocarbons.

A part of the liquid is preferably returned to the head of the trickle cooler through conduit 16 and sprayed by means of a shower 17 or a similar distributing device over the cooling surfaces 10 so as to keep them clean and facilitate the heat transfer from the gas to the cooling system.

The cooler 9 is constructed as a vertical tower which is filled with filling bodies and which contains spiral cooling tubes through which the cooling agent may be conducted. The cooling tubes may extend through the layer of filling bodies, or may be so distributed that alternate layers of filling bodies and cooling tubes are provided along the height of the tower. The cooling tubes may be provided with cooling fins or the like. The liquid which is passed in by means of the shower 17 or a similar distributing device, trickles down through the filling bodies and over the cooling tubes improving the heat exchange and keeping the cooling fins or the like clean.

The pre-cooled gas then passes through conduit 18 into the washing tower 1 and rises upward therein in counter-current to the downward trickling cold washing agent which flows from the regeneration in the distillation column 4 through conduit 19 and distributor 20 through the filling bodies and over the cooling tubes 21. A cooling system 21 is provided in the washing tower for indirectly cooling the gas and washing agent. It consists of cooling coils or the like through which the cold purified gas passes coming via line 22 from the washing tower 2 and discharging through conduit 23 for its use.

The construction of the washing tower 1 may be identical to that of the cooler 9 described above, except that the tower casing should be provided with suitable heat insulation.

The laden washing agent is withdrawn at the foot of the washing tower 1 and fed via pipe 24 and a pre-heater 25 to the rectifying column 4 through its lateral connection 32 for regeneration.

In the washing tower 1 substances are preferably scrubbed out of the gas to be purified which boil at a higher temperature than the washing agent and which are only partially condensed in the pre-cooler 9. Such substances include in particular water and hydrocarbons having C-numbers ranging upward from pentane and benzene and their homologues.

The cooled gas which has been freed from these vapor admixtures passes through conduit 26 into the washing tower 2 and flows upward therein in countercurrent to the downward trickling cold washing agent. In this connection, the gaseous impurities, such as hydrogen sulfide and organic sulfur compounds, carbon dioxide, low-boiling unsaturated hydrocarbons acting, for instance, as gum and resin-formers and the like, are absorbed by the washing agent so that only the gas components known as permanent gases, namely hydrogen, carbon monoxide, methane, ethane and nitrogen, remain as cleaned gas. The washing tower 2 is in the form of a vertical, cylindrical tower having heat-insulated walls. The tower is filled with filling bodies, as, for example, Raschig rings, or may be provided with bubble plates or the like. In larger installations having a high through-put of washing agent, it is preferable to use filling bodies in order to obtain a good distribution of the liquid, while in smaller installations bubble plates and caps as are used in conventional gas washers or distillation columns or similar devices have proven preferable. This gas discharges at the head of the washing tower 2 through the pipe 22 and is conducted through the cooling system 21 in the washing tower 1 in order to utilize its cold. It is finally taken for use from line 23. Should its temperature still be sufficiently low to be used for cooling purposes, it can be conducted through additional indirect heat exchange, for instance through the cooling system 10 of the pre-cooler 9.

The laden washing agent is removed from the foot of the washing tower 2 and passed through the conduit 27 via a pressure reduction valve 28 into the pressure reduction vessel 3. Due to the reduction of the pressure down to atmospheric pressure or a still lower pressure, the gas components which were taken up at elevated pressure are again released and escape at the head of the vessel through the conduit 29.

This gas essentially consists of carbon dioxide, hydrogen sulfide, and carbon monoxide sulfide. The gas is removed through the line 29 at a temperature of about —60° C. In order to utilize this cold, it is passed in indirect heat-exchange contact in the heat exchanger 37 with the regenerated washing agent, and thereafter is removed through the line 43 for further utilization.

In this connection there is used as heat of desorption a quantity of heat which corresponds approximately to the quantity of heat released in the washing tower 2 upon the taking up of the gas components. The pressure-reduced washing agent therefore cools off to the same extent as it was heated in the washing tower by the heat of absorption. At the foot of the pressure reduction vessel, cold washing agent is removed and returned by means of a pump 30 through conduit 31 to the washing tower 2 and distributed in the latter by a spray device 38 located at the upper end of the washing tower.

A part of the pressure-reduced washing agent is tapped off through the line 44, combined with the laden washing agent coming from the washing tower 1 and subjected, together with the latter, to a complete regeneration by distillation preventing the washing agent from eventually becoming completely contaminated and losing its effectiveness.

In this complete regeneration, the materials will be removed from the washing agent which are not removed or which are only partially removed during the expansion. These materials include organic compounds, such as, mercaptans and hydrocarbons with 2–4 carbon atoms per molecule, particularly the resin formers.

The combined streams of washing agent pass through conduit 24 into a pre-heater 25 and are then fed via line 32 laterally into the rectification column 4.

In the sump of this column there is provided a heating system 33, as, for example, a stream coil, by means of which the washing agent is evaporated. At the head of the column, a gas-vapor mixture is removed. The gases contain organic sulfur compounds such as mercaptans and hydrocarbons with 2 to 4 carbon atoms per molecule, particularly the unsaturated resin formers. The vapors which are removed with the gases essentially consist of hydrocarbons having up to about 6 carbon atoms in their molecule which due to their residual vapor pressure would not condense in the washing tower 1. These hydrocarbons are non-polar materials. In the condenser 34 the gases are separated from the vapor, the latter being condensed and led back through the line 1, partially as recycled to the head of the column, and partially for removal through the line 45 for further utilization.

The non-condensed portions of the mixture are removed through the line 40. In order to be able to regulate the recycle quantity, partial amounts of the condensate are possibly removed from the recycle line 41 at 45.

At the side tap 35 behind the cooler 36, pure washing agent is obtained. It is cooled in the heat exchanger 37 by the mixture of scrubbed-out gas components escaping from the pressure reduction vessel 3, and distributed via line 19 to wash towers 1 and 2.

The feeding of the pure washing agent into the tower 2 takes place by means of the distributing device 39 which is located at the head of the tower and at some distance above the distributing device 38 for the washing agent which is purified solely by pressure reduction. By this arrangement there is created at the upper end of washing tower 2 a fine scrubbing zone in which the gas treated with washing agent which has been regenerated by pressure reduction is again subjected to a final washing with pure washing agent. In this way, gas components which are to be washed out, and which may still be present at the height of the distributing device 38 with a small residual partial pressure corresponding to the laden condition of the washing agent regenerated by pressure reduction, are completely washed out. When the requirements made with regard to the cleanliness of the treated gas permit such small residual quantities of impurities, the separate feeding of the washing agents can be dispensed with. In such case, line 31 discharges into line 19, and the distributor device is eliminated.

On the other hand, the action of the final washing stage can be increased by increasing the distance of the two distributor devices 38 and 39 from each other.

In the sump of column 4 there collect the substances which have been scrubbed out of the gas and the boiling points of which are higher than the boiling point of the washing agent. These substances are water and hydrocarbon oils. They are withdrawn from the column through conduit 42. The composition of this hydrocarbon mixture is very similar to that obtained from the line 14.

Losses of cold, which are produced during the operation by radiation or convection of heat or by incomplete degasification of the washing agent upon the regeneration, are supplemented by the refrigerator, the evaporator 8 of which is arranged in the lower end of the washing tower 2. By means of this refrigerator, the temperature level of the installation is set and maintained. The cold to be produced is slight since the cold requirements of the process are obtained in connection with the regeneration of the washing agent by pressure reduction in accordance with the principle of the expansion refrigerator.

This embodiment of the process in accordance with the invention is particularly well suited for the treatment of gases in which individual impurities which are to be scrubbed out are present with a high partial pressure and therefore in larger quantities. Such gas includes in particular the gas rich is carbon dioxide which is produced upon the gasification of solid fuels with oxygen or oxygen-rich gases and possibly steam under pressure, or else hydrogen-rich gas produced by converting water gas or other carbon monoxide-hydrogen mixtures.

When the gas to be treated is free of substances which have a higher boiling point than the washing agent, as is frequently the case in connection with the conversion gases which have just been mentioned, one low temperature washing stage can be sufficient for the purification so that in such a case, the washing tower 1 can be dispensed with.

Since, however, advisedly a small portion of the washing agent which is circulated in the washing tower 2 and the pressure reduction regenerator 3 is always subjected to a complete regeneration in order to prevent the slow accumulation in continuous operation of substances which are not expelled by the pressure reduction, the washing tower 1 does not constitute any additional expense. In any event it can be used as cooler in which the pre-cooled gas is sprayed and saturated with the washing agent with further cooling, to prevent the formation of ice from the moisture always present in the gas.

The dimensions of the washing tower 1 and of the rectifying column 4, as well as the quantities of washing agent circulating therein, therefore depend on the nature of the gas to be cleaned and can be selected so small that the scrubbing of the gas in accordance with the invention takes place practically in a single stage, the cold requirement of which is supplied practically completely from the expansion cold of the washing agent regeneration.

The washing tower 1 then becomes the heat exchanger in which the cold of the purified gas is transferred to the impure-pre-cooled gas and is retained for the washing process. In this way, the work required of the refrigerator is considerably reduced.

For the complete recovery of the cold contained in the purified gas, the number of spray towers indirectly cooled by this gas and directly cooled by the cold washing agent can elso be varied so that instead of the scrubbing tower 1, there is provided a plurality of such towers which the unpurified and purified gas pass through one after the other, and in the opposite direction as indirect heat exchangers and which are connected in parallel or in series with respect to the feeding and discharge of the spray liquid. In this connection, it depends on the nature of the gas whether when dimensioning these spray towers the washing action or the cooling action should have a more predominant role.

In the case of gases which contain only small quantities of the impurities which are to be washed out, the cold effect on the regeneration by pressure reduction is slight due to the low partial pressure thereof, but the cold requirement of the process is also reduced to the same extent. Furthermore, the difference between the concentrations of the impurities in the laden washing agent and in the washing agent which has been regenerated solely by pressure reduction is so slight that in the method of operation in accordance with Fig. 1, the absorption power of the washing agent would be utilized only to a very small extent.

Such gases are, for example, coke oven gas and other gases obtained in the degasification of solid fuels in which the main impurities, namely hydrogen sulfide, organic sulfur compounds and carbon dioxide, together amount to less than 10%. Similar conditions are present in natural gases and the waste gases of petroleum refining, which may contain hydrogen sulfide and organic sulfur compounds as impurities in quantities of up to about 10%.

The cleaning of such gases in accordance with the process of the invention is preferably effected in an installation in accordance with Fig. 5 in which the regeneration of the washing agent is effected by expulsion of the absorbed gas components by heating.

The installation consists essentially of the scrubbing or washing towers 101 and 102, the rectifying column 103, the pre-cooler 104; the refrigerator with the compressor 105, the condenser 106, the pressure reduction valve 107, the evaporator 108 and the heat exchangers 109 and 110.

Up to the washing tower 102, the installation corresponds to the one already described on the basis of Fig. 1.

The gas to be treated passes via line 111 into the pre-cooler 104 after it has been subjected to a conventional pre-cleaning. In the case of coke gas or gas from low temperature carbonization, this pre-cleaning consists, for example, of the condensation of the tar and the cooling to room temperature connected therewith.

In conduit 111 the impure gas has a temperature of about 30°. It flows downward in the pre-cooler 104 over the cooling surfaces 112, for instance a pipe coil cooled by water or by coolants obtained in the subsequent method steps, and is at the same time sprayed with the substances condensed in this connection which are returned from the separating vessel 113 via line 114 to the head of the spray cooler. This cooler is constructed in the same manner as cooler 9 shown in Fig. 4.

The cooled gas, the spraying liquid and the condensate formed pass into a separator 115 from which the liquid enters the separating vessel 113, while the cooled gas passes via line 116 into the washing tower 101 which is constructed in the same manner as the washing tower 1 shown in Fig. 4.

The condensate, which is formed in the pre-cooler 104 consists of water and a mixture of hydrocarbons of the gasoline boiling range, i. e., having about 6 to 12 carbon atoms in the molecule. According to the origin of the crude gas being purified, this mixture may contain greater or lesser amounts of aromatic or aliphatic unsaturated hydrocarbons.

The gas flows upward in said tower 101 in opposite direction to the clean, cold washing agent flowing downward and is furthermore cooled indirectly by the clean, cold gas which comes via line 117 from the washing tower 102 and flows through the cooling system 118 arranged in the washing tower 101.

At the bottom of the washing tower the washing and cooling liquid collect and are conducted through the conduit 119 through the pre-heater 126 or the like, to the regeneration in the rectifying column 103.

In the washing tower 101, the washing liquid absorbs organic sulfur compounds, such as, higher boiling mercaptans, thiophenes, and the like, in addition to hydrocarbons which are similar to those collected in the separating vessel 113.

The gas to be treated is freed in the scrubbing tower 101 of the substances present therein in the form of vapors and having a higher boiling point than the washing agent, and in particular of water, benzene, and gasoline and in this connection is furthermore cooled down. It then passes via line 120 into the washing tower 102 and flows upward therein in opposition to the downward flowing washing agent. The washing tower 102 is constructed similarly to the washing tower 2 shown in Fig. 4. In this connection the gas impurities having a lower boiling point than the washing agent, such as hydrogen sulfide, organic sulfur compounds, carbon dioxide and hydrocarbons, particularly the unsaturated hydrocarbons having a tendency to form resins, are scrubbed out so that only the so-called permanent gases such as hydrogen, carbon monoxide, methane, ethane and ethylene remain in the cleaned gas.

The cold clean gas leaves the scrubbing tower 102 at its upper end and is fed through line 117 to the cooling system 118 of scrubbing tower 101 and possibly also further indirect heat exchangers for the recovery of its cold and is then conducted to its place of use through line 121.

The laden cold washing agent is removed at the foot of the scrubbing tower 102 and fed to the regeneration tower. Through line 122 it passes first of all into a heat exchanger 109 in which a considerable portion of its cold is taken up by the washing agent returning from the regeneration tower into the washing stages. Thereupon the laden washing agent passes through one or more heat exchangers or pre-heaters 110, only one of which is shown in the figure and via the side connection 123 into the rectifying column.

The components of the impure gas which are absorbed by the washing liquid in the washing tower 101 have a higher boiling point than the washing agent. In order to separate the washing agent, it must be completely evaporated. The absorbed substances collect in the sump of the column and are removed from it through line 124. These materials consist of water and a mixture of hydrocarbons similar to those collected in the separating vessel 113. In addition, the sump product contains organic sulfur compounds, such as higher boiling mercaptan, thiophene, and the like. The necessary heat of evaporation is introduced by the heater 125, arranged in the sump of the column, and consisting of a steam-heated pipe coil or the like.

The components of the impure gas which are scrubbed out in the washing tower 102 have a lower boiling point then the washing agent and can therefore be expelled from it by heating.

The laden washing agents are therefore fed to the rectifying column, preferably laterally at different heights, the washing agent from washing tower 101 being introduced through conduit 119 and the heat exchanger or preheater 126 at the side connection 127 nearer the column sump, while the washing agent from washing tower 102 is introduced nearer the head of the column through the side connection 123.

The washing agent from which the absorbed impurities have been removed is recovered as side tap through the line 128 between these two admission places, and after condensation and cooling in the cooler 129, returns via the line 130 and the heat exchanger 109 in which it is cooled by the laden washing agent from washing tower 102 to the process temperature, back into the scrubbing stages over which it is distributed via the lines 131 and 132.

As head fraction, there is obtained from the rectifying column 103 a mixture of washing agent vapors and the gas components scrubbed out in the washing tower 102, which mixture is separated in the cooler 133 into condensable and non-condensable portions. The non-condensable portion contains the gaseous impurities washed out from the gas, as, for example, carbon dioxide, hydrogen sulfide, carbon oxy-sulfide, lower mercaptans, and the resin-forming, unsaturated hydrocarbons. This portion is removed from the cooler through the line 136.

The condensable portion, in addition to the washing agent vapor, contains hydrocarbons, which boil at a lower temperature than the washing agent, and, accordingly, have a number of up to about $C_5$, and which, owing to their residual vapor pressure, were not condensed, but passed into the washing tower 101. The condensable portion is recycled in whole or in part to the head of the column through the line 134, while excess quantities are removed from the discharge line 135.

The refrigerator, the evaporator 108 of which is arranged in the lower end of the washing tower 102, in this embodiment of the process of the invention does not only have the job of making up the losses of cold produced by radiation and convection from the outside, but, must also take up the heat of absorption which forms in the scrubbing tower 102 during the scrubbing process and which in the present case cannot be replaced again by pressure reduction of the laden washing agent by the desorption cold.

In addition to this, there is the loss of cold which is produced upon the regeneration of the laden washing agent by rectification, which, however, is counteracted extensively by heat exchange between the regenerated and the laden washing agent in heat exchanger 109.

In order to retain for the process the low temperature of the cleaned gas flowing out of the washing tower 102, a heat exchange between cold purified gas and pre-cooled unpurified gas is effected in the washing tower 101. In the same manner as described in connection with the installation shown in Fig. 4, the washing tower 101 can be replaced by a system of several such towers.

The simplest circuit which may be used for a high cooling action in the washing tower 101 is the spraying of this tower with a portion of the laden washing liquid emerging from the scrubbing tower 102, from the place in the washing agent circuit which is closest to the evaporator 108 of the refrigerator.

In order to relieve the refrigerator, heat exchangers can be provided wherever a sufficient temperature gradient exists between the media flowing to the washing tower 102 and the media coming from it.

Thus, for instance, the cooler 129 for the regenerated washing agent and the pre-heater 126 for the washing agent from the washing tower 101 to be regenerated can be combined into a heat exhcanger.

Alternately the cooling system 112 of the pre-cooler 104 can be passed through by the purified gas which has already passed through the cooling system 118 of the scrubbing tower 101 and possibly other heat exchangers, in such a manner that the said cooling system is, for example, inserted in this line.

Natural gases and gases obtained upon the thermal of catalytic cracking of petroleum, petroleum fractions, tars, tar oils and the like, as well as the residual gases of the catalytic hydrogenation of carbon monoxide differ from coke oven gas and producer gas as well as the gases obtained upon the gasification of solid fuels such as generator gas and pressure gasification gas in that they are richer in gaseous hydrocarbons, i. e., methane, ethane, propane, butane, while their content of carbon monoxide and hydrogen is lower.

Hydrogen sulphide, organic sulphur compounds, carbon dioxide and steam are present as impurities in these gases. Depending upon the use to which the purified gas is to be put, it may, however, also be necessary to remove the gaseous hydrocarbons entirely or partially from the gas. This is true, for instance, when the hydrogen is to be recovered from cracking gases or if carbon monoxide and hydrogen are to be recovered free of carbon dioxide, water vapor and hydrocarbons having more than three carbon atoms from the residual gas of a carbon monoxide hydrogenation in order to be reacted again in the same synthesis stage or a subsequent one.

For the purification of such gases in accordance with the process of the invention, there is used a plant of the type shown in Fig. 6.

This plant differs from the one shown in Fig. 5 in that for each of the two washing towers operated at low temperatures there is provided a special washing agent regeneration, so that it is possible to work with two separate washing agent circuits.

The plant consists of the washing towers 201 and 202, the distillation columns 203 and 204 and the pre-cooler 205.

These parts are identical in construction and action to the corresponding parts of the plants shown in Figs. 4 and 5. The arrangement of the plant also corresponds extensively to that already shown in the previous figures. The only difference is that the washing agent of tower 201 is separated in a special column 204 and regenerated independently of the washing agent of washing tower 202. The gas is cooled in the pre-cooler 205 from the ambient temperature, for example, from 30° C. to close to 0° C. In the same manner as in the colers 9 and 104, there is also provided a cooling system which is fed with water or a cooling agent obtained in a subsequent process which is trickled over the cooling surfaces with a portion of the non-aqueous phase of the condensate formed in the cooler in order to improve the heat transfer and to maintain the cooling surfaces clean.

The washing tower 201 corresponds to the washing towers 1 and 101 of Figs. 4 and 5. It is provided with a cooling system 224 through which the cold clean gas flows.

The washing tower 202 corresponds to the washing towers 2 and 102 of Figs. 4 and 5, and is provided on the lower end with a cooling system 208 and a refrigerating machine 209.

This washing tower is provided with distillation column 203 while distillation column 204 is connected with washing tower 201.

For the purification of natural gas, refinery gas, synthesis residual gas or the like, the washing tower 201 is operated with a non-polar washing agent. For this purpose there enter into question particularly those hydrocarbon mixtures which are obtained in a previous or subsequent plant, i. e., a cracking plant, carbon monoxide hydrogenation plant or the like. There are suitable aliphatic or naphthenic hydrocarbons, which may also contain C=C double bonds, and preferably hydrocarbon mixtures having a carbon number between $C_6$ and $C_{12}$, for example, gasoline fractions or also pure hydrocarbons which boil in a range from 70 to 150° C.

This washing agent absorbs hydrocarbons having 3 to 5 carbon atoms which have not been removed by condensation in the pre-cooler 205 or have been only incompletely removed. In the same way, small quantities of water are separated here from the gas.

The laden washing agent is conducted from the lower end of the washing tower 201 through conduit 210, a pressure reduction vessel 222 and a preheater 211 into the side of the distillation column 204 at 212. In the column sump which is heated by the heating element 236, there collect the substances of a boiling point higher than the washing agent, i. e., hydrocarbons, which were not completely condensed in the cooler 205, and water.

As top fraction of the column 204, there are obtained the hydrocarbons having 3 to 5 C atoms per molecule and possibly also a small quantity of washing agent. Gases and condensable substances are separated in the condenser 214. The non-condensable substances, consisting essentially of propane, butane, pentane and the corresponding unsaturated hydrocarbons are obtained from the conduit 215. The condensate is withdrawn through conduit 216 and returned in part through conduit 217 to the top of the column as recycle. Any excess of condensate which forms in this circuit is removed continuously or intermittently through conduit 221.

The regenerated scrubbing agent is obtained from the column as a side fraction from the connection 218 and is returned through the condensation and cooling device 219 and conduit 220 to the top of washing tower 201.

This condensation and cooling apparatus is represented in the drawing, for purposes of simplification, merely as a condenser. It comprises furthermore a heat exchanger in which the condensed washing agent is cooled down to the inlet temperature required in the washing tower 201 by cold liquids or gases obtained in the process. Such an indirect heat exchange takes place between the pure washing agent in conduit 220 and the cold laden washing agent in conduit 210. Since the laden washing agent is subjected to a pressure reduction before entering the pre-heater 211, it cools down upon the escape of the absorbed $C_3-C_4$ hydrocarbons. The heat of absorption produced in the washing tower 201 is in this connection removed as desorption cold. The pressure release vessel 222 in conduit 210 has therefore the same action as the regenerating tower 3 in Fig. 4. During the pressure reduction gases escape from the pressure release vessel 222 through the conduit 233.

The cold contained in the pressure-reduction gases escaping at 233 can be transferred by indirect heat exchange to the pure washing agent in conduit 220. In this arrangement, the additional requirement of cold in washing tower 201 can be supplied by the refrigerator 209 and introduced by the cold pure gas via the cooling system 224.

The gas, free of hydrocarbons having more than 2 carbon atoms, passes through conduit 225 into the washing tower 202, which is operated with one of the polar washing agents which are also suitable for operation of the plants according to Figs. 4 and 5.

The circulation of the washing agent through washing tower 202 and regenerating column 203 is the same as described in connection with Fig. 5.

In the washing tower 202, hydrogen sulphide, organic sulphur compounds and carbon dioxide are washed out of the gas. They are separated from the washing agent in the regeneration column 203 and escape through conduit 230 as the top fraction. In the condenser 231 the entrained washing agent vapors are separated and returned as recycle via conduit 232 to the top of the column. The solvent circuit can be filled or recycle excesses which may form during the process due to the accumulation of gas impurities having a boiling point lower than the scrubbing agent, can be withdrawn through the conduit 223. The pure washing agent condenses in the condenser 234 and after being cooled by cold liquids or gases circulating in the process, is returned through the conduit 226 to the top of the washing tower 202 in the manner which has already been described.

The sumps of the distillation columns 203 and 204 are provided with steam coil heaters 235 and 236. The distillation residues obtained in the column sumps can be cooled in the heat exchangers 238 and 211 respectively by the laden cold washing agent flowing to the columns and be thus used for preheating the washing agent. They are then removed through conduits 239 and 240.

Since, particularly in the washing tower 202, hardly any materials pass into the washing agent which have a higher boiling point than such agent, it is frequently sufficient to regenerate the washing agent solely by distillation. In this case, the pure washing agent is obtained in the column sump and is conducted out of conduit 240 after sufficient cooling by heat exchange with cold liquids or gases circulating in the process into the conduit 226. A part of the washing agent can, from time to time, be replaced by fresh washing agent.

The same arrangement can also be made in the distillation column 204, particularly if it is possible to expel the water azeotropically taken up in the washing tower 202 from the washing agent as the top fraction.

The refrigerator 209 is operated with ammonia. It produces a temperature of −35° C. at the foot of the washing tower 202.

A temperature of −20 to −25° C. prevails in the washing tower 201 cooled by the cold clean gas. The temperature in the pre-cooler is maintained between +5° and 0° C.

For a throughput of gas to be purified of 1000 cubic meters (N. T. P.) per hour, 1500 kilograms of gasoline are maintained in circulation through the washing tower 201 and the column 204, and 2400 kilograms of methyl alcohol through the washing tower 202 and the column 203.

In place of the polar washing agent used, any known polar organic washing liquid which is substantially chemically non-reactive with the gas components, and which has a freezing point below the washing temperature, may be used and compatible results will be obtained, since the washing action is mechanical and merely depends on the polarity of the washing agent. Thus, for example, any of the washing agents mentioned in column 3 of this specification may be used.

The following examples are given by way of illustration and not limitation:

EXAMPLE 1

*Cleaning of gas, which is obtained by the gasification of solid fuels at elevated pressure with oxygen or oxygen-rich gases and steam*

The crude gas has the following composition:

| | |
|---|---|
| $CO_2$ | 32.1%. |
| $H_2S$ | .1%=1.5 gr./N m.$^3$. |
| Unsaturated hydrocarbons | .5%. |
| CO | 17.3%. |
| $H_2$ | 37.1%. |
| $CH_4$ | 12.1%. |
| $N_2$ | .8%. |

In addition, the gas always contains small quantities of water vapor and hydrocarbon vapors, which remain after the preceding method steps in which the tar materials, oils, and water, are removed. In connection with a gas produced by the gasification of carbonaceous material under pressure, these hydrocarbons preponderantly consist of olefins and naphthenes, which have carbon numbers between 5 and 12. Among these, are materials which are inclined toward resin formation. When the amounts of organic sulfur compounds not detected by the usual gas-analysis methods are included, the total content of sulfur content in the crude gas amounts to about 2 grams per normal cubic meter.

Due to its high carbon dioxide content, this gas is preferably treated in an installation in accordance with Fig. 4. The following numerical data refer to an hourly rate of flow of 1,000 m.$^3$ (N. T. P.).

The crude gas enters the plant through conduit 11 with a temperature of about +30° C. and leaves the separator 12 with a temperature of about +3° C.

In washing tower 1 it is sprayed with the methyl alcohol purified in rectification column 4, which enters through conduit 19 with a temperature of —50° C. 0.08 m.$^3$ of methyl alcohol are used for very 1,000 m.$^3$ (N. T. P.) crude gas. From the gas there are separated here about 0.01 m.$^3$ hydrocarbons and some water, so that because of these additions to the washing agent about 0.09 m.$^3$ laden washing agent flow through line 24 to the regeneration device 4.

The gas leaves the washing tower 1 through conduit 26 at a temperature of about —30° C. and enters into the lower end of the scrubbing tower 2, at which the refrigerator maintains a temperature of —30 to —35° C. The coolant circulating therein has a temperature in the evaporator 8 of —37° C. By the distributor 38, 2.5 m.$^3$ of methyl alcohol regenerated by expansion (pressure reduction) and having a temperature of —60° C. are charged from a place located in the upper part of the tower. At the head of the washing tower, 0.25 m.$^3$ methyl alcohol having a temperature of —50° C. and purified by rectification is fed through the distributor 39. The cleaned gas leaves the washing tower 2 through conduit 22 with a temperature of —50° C. and, after the heat exchange with the pre-cooled crude gas in washing tower 1, and possibly after passing through further heat exchanges, is removed via the line 23 in a quantity of 650 m.$^3$ (N. T. P.) per hour.

The quantities of washing agents fed by distributors 38 and 39 after passage through the tower are laden with the gas impurities, and removed at the foot of the washing tower 2 with a temperature of —30° C. and conducted through conduit 27 via the pressure reducing valve 28 through the pressure reduction vessel 3. At the normal or reduced pressure prevailing therein, the gas components taken up by the washing agent escape, a temperature of —60° C. being produced. Thereafter, both the expansion gases and the regenerated washing agent leave the pressure reduction vessel.

The expansion (pressure reduction) gases, which consist mainly of carbon dioxide and hydrogen sulfide, pass into the heat exchanger 37 via the conduit 29.

In the discharge line 53 there are obtained 300 m.$^3$ (N. T. P.) of this gas mixture per hour.

2.5 m.$^3$ per hour of the washing agent regenerated by pressure reduction are returned to distributor 38 in washing tower 2.

The quantity of washing agent corresponding to the charging of washing agent by the distributor 39 is branched off through the conduit 44 and passed, together with the laden washing agents from washing tower 1 into the rectification column.

As top product there is obtained a mixture of scrubbed-out gas components, methyl alcohol and gasolines of a boiling point lower than methyl alcohol. The condensable portion of this mixture is taken from the cooler 34 via the conduit 41 and returned as recycle to the head of the column. Excess quantities are removed from this circuit by the conduit 45. The non-condensable portions, which consist essentially of the gas components which have been washed out, are obtained from conduit 40 in a quantity of about 50 m.$^3$ (N. T. P.) per hour.

From the side tap 35 there are obtained, behind cooler 36 about 0.3 m.$^3$ pure methyl alcohol, which is returned to the washing towers via the heat exchanger 37.

From the column sump there are removed each hour about 0.01 m.$^3$ of substances scrubbed out from the gas and having a higher boiling point than methyl alcohol, such as water and aliphatic hydrocarbons, at a temperature of +70 to +75° C. Their sensible heat can be transferred in a heat exchanger (not shown) or, for example, in the pre-heater 25, to the cold laden washing agent flowing out of conduits 24 and 44.

The cleaned gas coming from conduit 23 has the following composition:

| | Percent |
|---|---|
| $CO_2$ | 2.0 |
| CO | 26.0 |
| $CH_4$ | 15.5 |
| $N_2$ | 1.5 |
| $H_2$ | 55.0 |

The residual content of hydogen sulfide and organic sulfur compounds in the purified gas is less than 1 mg. per normal cubic meter.

It is excellently well suited for use as long-distance gas, and can be used to advantage as synthesis gas for the hydrogenation of carbon monoxide, since it is free of sulfur compounds and unsaturated hydrocarbons which tend to form resins.

The energy requirement of the insulation for an hourly passage of 1,000 m.$^3$ (N. T. P.) crude gas is:

7 kw. for electrical power
0.07 ton low pressure steam with simultaneous utilization of the waste heat of the gas production
6 m.$^3$ recycle cooling water of 27° C.
3 m.$^3$ fresh water of 20° C.

EXAMPLE 2

*Cleaning of coke oven gas*

The crude coke oven gas has the following composition:

| | |
|---|---|
| $H_2S$ | 0.6% by volume = 7 gr./N m.³ |
| $CO_2$ | 2.5% by volume. |
| $C_2$ and $C_3$ hydrocarbons | 2.0% by volume. |
| Unsaturated hydrocarbons (resin-formers) | 1.0% by volume. |
| CO | 5.0% by volume. |
| $H_2$ | 57.0% by volume. |
| $CH_4$ | 26.0% by volume. |
| $N_2$ | 5.0% by volume. |

In addition to this, there are present moisture; organic sulfur compounds in a quantity of about 0.1 gram per cubic meter (N. T. P.) gas; small quantities of hydrocyanic acid, as well as benzene and naphthaline vapors which may total up to 10 grams per m.³ (N. T. P.). The aliphatic hydrocarbons are divided on the one hand into saturated and slightly unsaturated hydrocarbons, and on the other hand into strongly unsaturated hydrocarbons which represent the resin-formers. These materials are in the gas in the form of vapors. They remain after the conventional coal tar condensation and gas purification due to their residual vapor pressure at the given purification temperature. In connection with coke oven gas, a greater proportion of aromatic hydrocarbons, benzole, toluole, xylole, and naphthalene are present.

Coke oven gases contain 92 to 95% of components which are considered permanent gases, such as methane, carbon monoxide, hydrogen and nitrogen. The gas components which are to be scrubbed out, amounting to 5%, are small in quantity but have a great influence on the quality and industrial usefulness of the gas. Due to the small amount of impurities in the total gas, the gas purification is preferably carried out in an installation in accordance with Fig. 5.

The crude gas enters the precooler 104 with a temperature of +30° C. and leaves it at a temperature of about +3° C. Water, naphtha, benzene homologues and some naphthaline, which condense in this cooling zone, separate in liquid form in the separator 115.

The gas enters the washing tower 101 in which benzene and other hydrocarbons of the same boiling range, as well as residual naphthaline and water are scrubbed out at −10° C. and with 0.09 m.³ methyl alcohol for 1,000 m.³ (N. T. P.) crude gas per hour. The indirect cooling of this washing tower is effected by the clean gas entering through conduit 117 with a temperature of −30° C. The washing agent also flows with a temperature of −30° C. through the conduit 132. The gas discharging from washing tower 101 thereupon enters washing tower 102 with a temperature of −25 to −28° C. and is sprayed there with 4 m.³ methyl alcohol per 1,000 m.³ (N. T. P.) crude gas. The clean gas discharges at the head of washing tower 102 through conduit 117 with a temperature of −30° C. and after the indirect heat exchange with pre-cooled crude gas in scrubbing tower 101 and possibly also in further heat exchanges, is removed from conduit 121 in a quantity of 920 m.³ (N. T. P.) per hour. The clean gas has the following composition:

| | Percent by volume |
|---|---|
| $H_2S$ | ---- |
| $CO_2$ | 2.0 |
| $C_2$ and $C_3$ hydrocarbons | 1.0 |
| Unsaturated hydrocarbons (resin-formers) | ---- |
| CO | 5.0 |
| $H_2$ | 58.0 |
| $CH_4$ | 27.0 |
| $N_2$ | 6.0 |

The content of carbon dioxide and hydrocarbons in the gas is substantially reduced. The sulfur content in the form of hydrogen sulfide, or organic sulfur compounds amounts to less than 1 mg. per normal cubic meter. The resin formers and hydrocarbon vapors are completely eliminated and the gas is completely dry.

At the foot of washing tower 102 laden washing agent is removed with a temperature of −30° C. This temperature is maintained by the refrigerator in the evaporator system of which the coolant has a temperature of −37° C. The rectification column 103 must take care of the passage of the quantities of washing agents from both towers in an amount of about 4.1 m.³ per hour. Since as head fraction there is obtained an azeotropic mixture of methyl alcohol and benzene, a portion thereof is removed advisedly continuously from the recycle line 134 and worked up by an extraction process, for instance by extraction with water. The methyl alcohol recovered in this connection is returned to the column at a suitable place, preferably through the side connection 127 for complete purification.

In order to keep the temperature difference between the upper and lower ends of the washing tower 102 small, a cooling system is advisedly also inserted in conduit 131 which system cools the regenerated washing agent to −30° C.

The requirement of this installation in energy and materials for an hourly passage of 1,000 m.³ (N. T. P.) crude coke oven gas per hour is:

26 kw. electrical power
0.5 ton low pressure steam
15 m.³ cooling water
33 m.³ fresh water at +20° C.

In the same way gases from low temperature carbonization which are similar in quality to coke oven gas can also be treated. This is also true of gases which are prepared in gas producers under normal pressure with air, oxygen and steam as gasification agents.

EXAMPLE 3

A natural gas is to be imparted the properties of a long distance supply gas. For this purpose all hydrocarbons having more than 2 carbon atoms per molecule as well as the sulphur must be removed along with any carbon dioxide which may be present. The gas to be purified has a pressure of 50 atmospheres. It has the following composition:

| | |
|---|---|
| $CH_4$ | 80% (by volume). |
| $C_2$-hydrocarbon | 9%. |
| $C_3$-hydrocarbon | 7%. |
| $C_4$-hydrocarbon | 1%. |
| $C_5$-hydrocarbon | 1%. |
| $H_2S$ hydrocarbon | 2%. |

The water vapor content of the gas is slight.

Pentanes and the higher hydrocarbons are extensively removed by condensation in the pre-cooler 205 of the plant shown in Fig. 6. The water vapor also condenses here.

Propane and butane are absorbed in the scrubbing tower 201 by the nonpolar scrubbing agent. As scrubbing agent there can be used a pure hexane, heptane or octane or else a fraction of aliphatic gasolines of suitable boiling point range. Since these substances have only a slight power to dissolve sulphur compounds, they firmly retain the hydrocarbons of the gas but permit the sulphur compounds to pass through. The latter are then absorbed in the scrubbing tower 202 by the polar washing agent, methyl alcohol.

The pure gas is obtained from conduit 241. Hydrogen sulphide is removed at the vent 242 of the condenser 231. The gas-oil hydrocarbons are received to a great part from the pressure reduction vessel 222 or a heat exchange provided behind the latter. A further smaller portion is obtained from the venting 215 of the condenser 214.

The purified gas contains 90% by volume methane and 10% by volume ethane.

EXAMPLE 4

In the synthesis of liquid hydrocarbons by the hydrogenation of carbon monoxide on iron-containing catalysts at an elevated pressure of about 20 atmospheres absolute, there remains after separation of the synthesis products which are condensable at ambient temperature, a residual gas which has the following compositions:

| | |
|---|---|
| $CO_2$ | 7% (by volume). |
| CO | 23%. |
| $H_2$ | 4% (by volume). |
| $N_2$ | 2%. |
| $CH_4$ | 27%. |
| $C_2+C_3$ | 0.3%. |
| $C_4+C_5$ | 0.4%. |
| CnHm | 0.3%. |

The methane homologs, ethane and propane, designated by $C_2$ plus $C_3$ constitute only a very small portion of the gas. The higher members of the methane series are designated by $C_4$ and $C_5$. This fraction may contain, in addition to butane and pentane, also hexane and higher members in small quantities, which due to their residual vapor pressure pass through the condensation of the liquid synthesis products. The hydrocarbons designated CnHm are the lower members of the olefine series up to the pentanes. The gas is saturated with water vapor after the condensation of the liquid synthesis products.

The purification of this gas has the purpose of removing the carbon dioxide, the methane homologs, the olefine hydrocarbons and the water vapor, in order to bring the content of non reacted carbon monoxide and hydrogen to the highest possible concentration.

Upon the treatment of the gas in a plant in accordance with Fig. 6, pentane and the higher methane homologs as well as the greatest part of the water vapor condenses in the pre-cooler 205 and separates from the gas. Propane and butane are scrubbed out in the washing tower 201. As washing liquid there is used a fraction of the liquid synthesis product having a boiling point range of about 80 to 120° C.

The carbon dioxide is then washed out with methyl alcohol in the washing tower 202.

The purified gas then has the following composition:

| | Percent |
|---|---|
| CO | 25 |
| $H_2$ | 43 |
| $N_2$ | 2 |
| $CH_4$ | 30 |

It can be mixed again with the fresh synthesis gas or be returned as recycle gas to the synthesis chamber or else be used as fuel gas with long distance supply properties, in which latter case a catalytic methanization for detoxication and increase of the heating value is particularly simple since the gas is completely free of sulphur.

EXAMPLE 5

As the residual gas of a cracking refining of mineral oil fractions the following gas was obtained after separation of the substances which condense at the ambient temperature (around 20° C.):

| | |
|---|---|
| $H_2S$ | 6.0% (by volume). |
| $CO_2$ | 1.5%. |
| CO | 0.7% (by volume). |
| $H_2$ | 9.0%. |
| $CH_4$ | 34.0%. |
| $C_2H_6$ | 19.0%. |
| $C_2H_4$ | 7.0%. |
| $C_3H_8$ | 4.0%. |
| $C_3H_6$ | 7.0%. |
| $C_4H_{10}$ | 2.0%. |
| $N_2$ | 9.8%. |

In this state the gas is furthermore saturated with water vapor.

Upon treatment in the plant shown in Fig. 6, hydrogen sulphide, carbon dioxide and the homologs of methane and ethylene from propane and propylene upwards are separated from it. The group of substances designated $C_4H_{10}$ contains not only the butane but also butenes and higher paraffin and olephine hydrocarbons up to 6 carbon atoms, which due to their residual vapor pressure have passed through the condensation of the substances liquid at room temperature.

The purified gas has the following composition:

| | Percent (by volume) |
|---|---|
| CO | 0.9 |
| $H_2$ | 10.8 |
| $CH_4$ | 42.9 |
| $C_2H_6$ | 24.0 |
| $C_2H_4$ | 8.9 |
| $N_2$ | 12.5 |

The impurities which have been scrubbed out constitute 20% of the crude gas. 10% thereof are the hydrocarbons, propane and propylene, which are scrubbed out in the washing tower 201 by means of a gasoline fraction of a boiling point range of 80 to 120° C. which is taken from the end product of the refining process.

2% butane and higher hydrocarbons condense in the precooler 205 together with the water vapor. Hydrogen sulphide and carbon dioxide, which constitute the remaining 8%, are scrubbed out in the washing tower 202 by means of methyl alcohol.

We claim:

1. Process for the purification of combustible gases comprising a member selected from the group consisting of carbon monoxide, hydrogen, methane and mixtures thereof, and containing as impurities hydrogen sulfide with a member of the group consisting of organic sulfur compounds, gum and resin formers, cyanogen compounds, carbon dioxide, and mixtures thereof, which comprises contacting such a gas at a temperature of below about —10° C. at a pressure of at least 2 atmospheres with a polar organic washing liquid substantially chemically non-reactive with the gas components and having a freezing point below said contacting temperature to thereby remove a substantial portion of said hydrogen sulfide and said second mentioned group member, and recovering a purified gas having a substantially reduced content of said impurities.

2. Process according to claim 1, in which said contacting is effected in at least two stages.

3. Process according to claim 1, in which said washing liquid is methanol.

4. Process according to claim 1, in which said intimate contacting is effected by passing the gas and said washing liquid in counter-current flow contact with each other with a decreasing temperature of contact in the direction of gas flow.

5. Process according to claim 1, in which said intimate contacting is effected at a pressure of about 8–20 atmospheres.

6. Process according to claim 1, in which said contacting is effected at a temperature below about —30° C.

7. Process according to claim 6, in which said contacting is effected at a temperature between about —45 and —75° C.

8. Process according to claim 1, in which said washing agent contains 1–50% water.

9. Process according to claim 8, in which said water and washing agent are present in substantially eutectic mixture.

10. Process according to claim 1, which includes regenerating washing agent after said contacting by removal of the absorbed impurities, and recycling the washing agent to the process.

11. Process according to claim 10, in which said regeneration is at least partially effected by pressure release with expansion and in which the heat absorption effect of said expansion is utilized for further cooling in the process.

12. Process according to claim 1, which includes separating any substances having a higher boiling point than said washing liquid from the gas prior to said contacting.

13. Process according to claim 12, in which said separation of the higher boiling substances is effected by condensation in the presence of a polar organic washing liquid with cooling to a temperature below 0° C.

14. Process according to claim 1, in which said contacting is effected by passing the washing agent along a path of flow in contact with said gas and which includes regenerating the washing agent after said contacting in a multi-step regeneration and recycling the washing liquid from each regeneration step to a different place along said path of flow with the washing liquid from the first regeneration steps being passed the beginning the path of flow and the washing liquid from the last regeneration steps being passed to the end of the path of flow.

15. Process according to claim 1, which includes contacting the gas at a temperature below about 0° C. with a non-polar, organic washing liquid, chemically non-reactive with the gas components, having a freezing point below said contacting temperature, prior to said contacting with said polar organic washing liquid.

16. Process according to claim 1, in which said contacting is additionally effected with a non-polar organic washing liquid having a freezing point below said contacting temperature.

17. Process according to claim 1, in which said gas is natural gas.

18. Process according to claim 1, in which said contacting is effected in two separate series-connected washing towers, the gas prior to said contacting being pre-cooled to a temperature not substantially in excess of about 0° C. with the removal of condensed liquids, passed upwardly through the first washing tower and thereafter upwardly through the second washing tower, the washing agent being passed downwardly from the upper portion of the first washing tower and downwardly from two separately spaced apart heights in the second washing tower, the washing agent from the bottom of the second washing tower being expanded for the partial removal of absorbed impurities with a corresponding cooling and a major portion thereof recycled to a lower point of introduction into said tower, the remaining portion of the expanded washing agent along with the washing agent from the bottom of said first tower being rectified for the removal of the absorbed impurities and recycled to the first tower and the upper point of introduction into said tower.

19. Process according to claim 18, in which said polar organic washing agent comprises methanol.

References Cited in the file of this patent

UNITED STATES PATENTS

| | | |
|---|---|---|
| 2,048,656 | Hunt et al. | July 21, 1936 |
| 2,649,404 | Reynolds | Aug. 18, 1953 |
| 2,727,587 | Karwat | Dec. 20, 1955 |

FOREIGN PATENTS

| | | |
|---|---|---|
| 498,100 | Belgium | Sept. 30, 1950 |